United States Patent [19]

Rubinshtein

[11] 4,319,551

[45] Mar. 16, 1982

[54] ROTARY INTERNAL COMBUSTION ENGINE

[76] Inventor: Bernard Rubinshtein, 215 Blueberry La., Apt. C, Thousand Oaks, Calif. 91360

[21] Appl. No.: 128,091

[22] Filed: Mar. 7, 1980

Related U.S. Application Data

[63] Continuation-in-part of Ser. No. 9,774, Feb. 6, 1979, abandoned.

[51] Int. Cl.$^3$ ............................................. F02B 53/00
[52] U.S. Cl. ..................................... 123/245; 418/35
[58] Field of Search .................... 123/245; 418/33, 35, 418/36, 119

[56] References Cited

U.S. PATENT DOCUMENTS

| | | | |
|---|---|---|---|
| 1,069,742 | 8/1913 | Tygard | 123/232 |
| 1,212,649 | 1/1917 | Krikorian | 418/35 |
| 1,302,233 | 4/1919 | Sheridan | 123/245 X |
| 1,790,534 | 1/1931 | Chevallier et al. | 418/35 |
| 2,687,609 | 8/1954 | Mallinckrodt | 418/35 |
| 3,112,868 | 12/1963 | Hagen | 418/119 |
| 3,311,094 | 3/1967 | Kehl | 123/245 X |
| 4,212,271 | 7/1980 | Rigterink | 123/245 X |

*Primary Examiner*—Michael Koczo, Jr.
*Attorney, Agent, or Firm*—Christie, Parker, Hale

[57] ABSTRACT

A rotary internal combustion engine has as its principal components (in one embodiment): a drive shaft; two annular carrying walls, each supporting at least two arcuate pistons, the carrying walls being mounted upon the drive shaft through inner one way clutches such that the pistons of the two carrying walls are interdigitated; an annular housing connected to the outer edges of each of the carrying walls through outer one way clutches; and two endplates supporting the carrying walls. The pistons divide an operating chamber defined by the drive shaft, the two carrying walls, and the annular housing into four isolated volumes which function as the work chambers of the engine. The intake, ignition and exhaust needs of each work chamber are supplied through ports in the carrying walls which communicate with grooves and commutator strips in the endplates. The clutches are aligned so that when any two adjacent pistons are forced apart (as by combustion in the work chamber formed by the two pistons), the carrying wall supporting one of the pistons locks against the housing and releases the drive shaft, while the carrying wall supporting the other piston locks against the drive shaft and releases from the housing. Thus, combustion in successive work chambers is transformed into rotational motion of the drive shaft. Since opposite pairs of pistons are mounted on the same carrying wall, the expansion of one work chamber changes the volume of the remaining work chambers, facilitating the compression, exhaust, and intake operations in those work chambers. The engine is adaptable to a variety of operating configurations.

18 Claims, 18 Drawing Figures

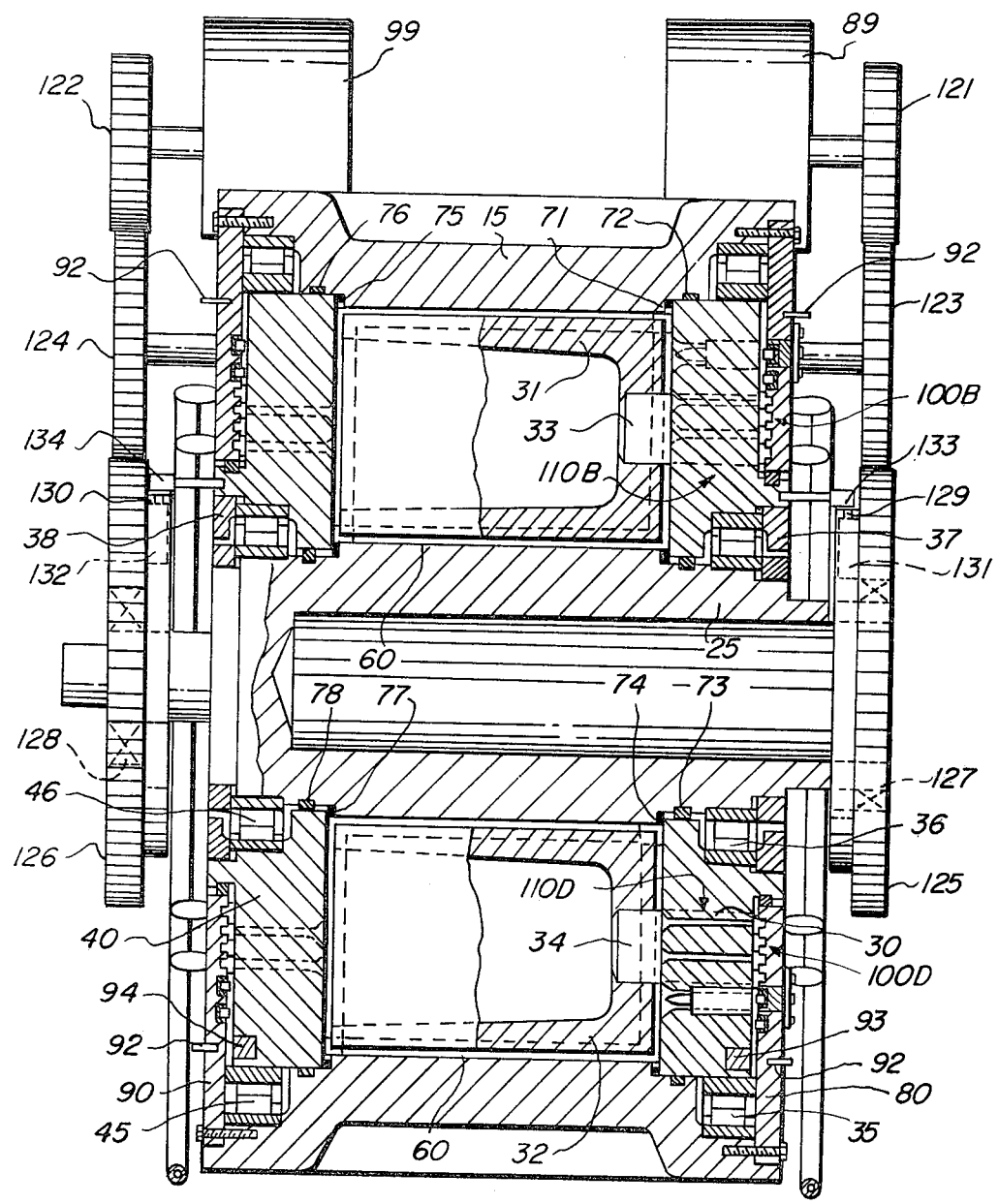

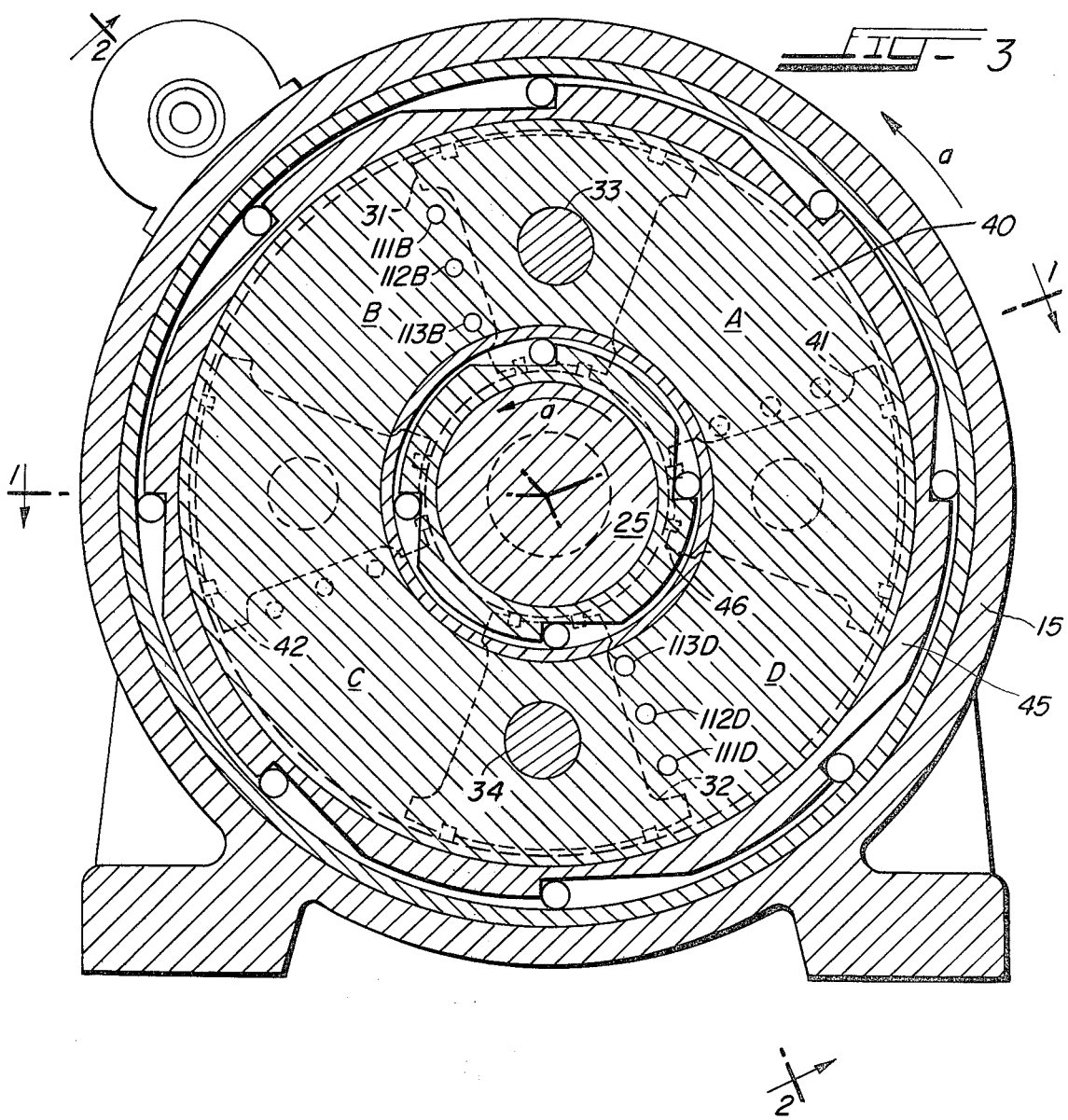

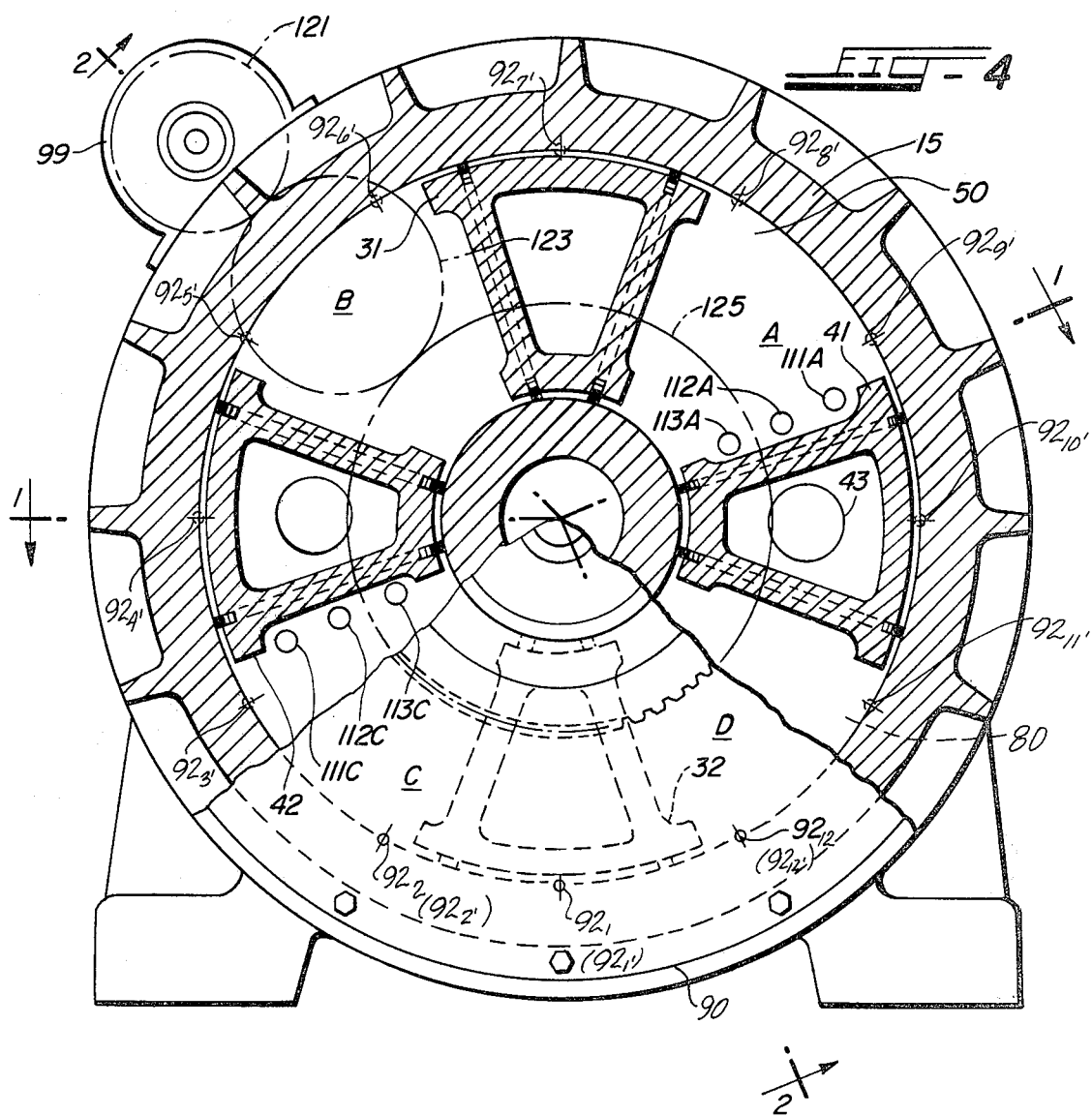

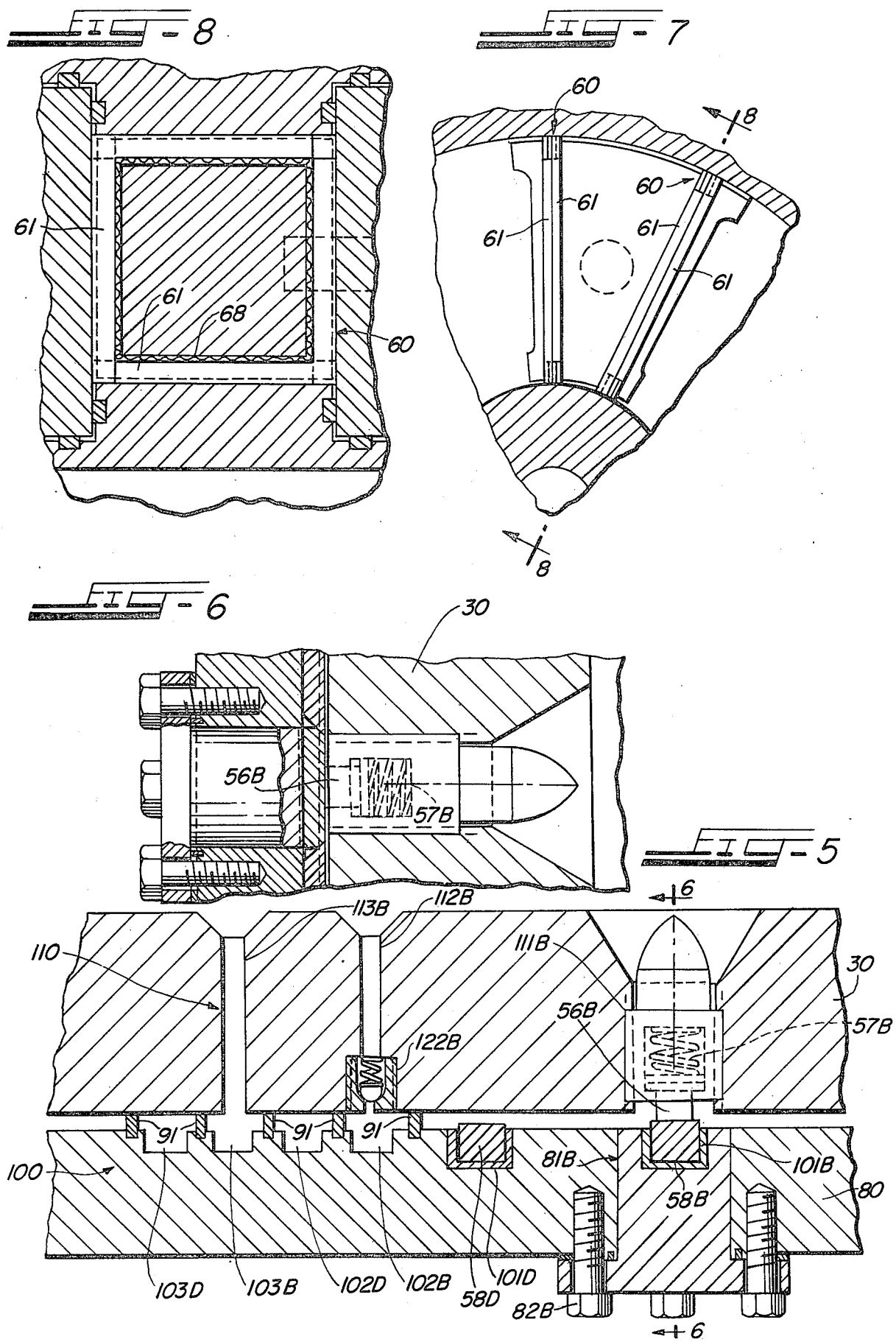

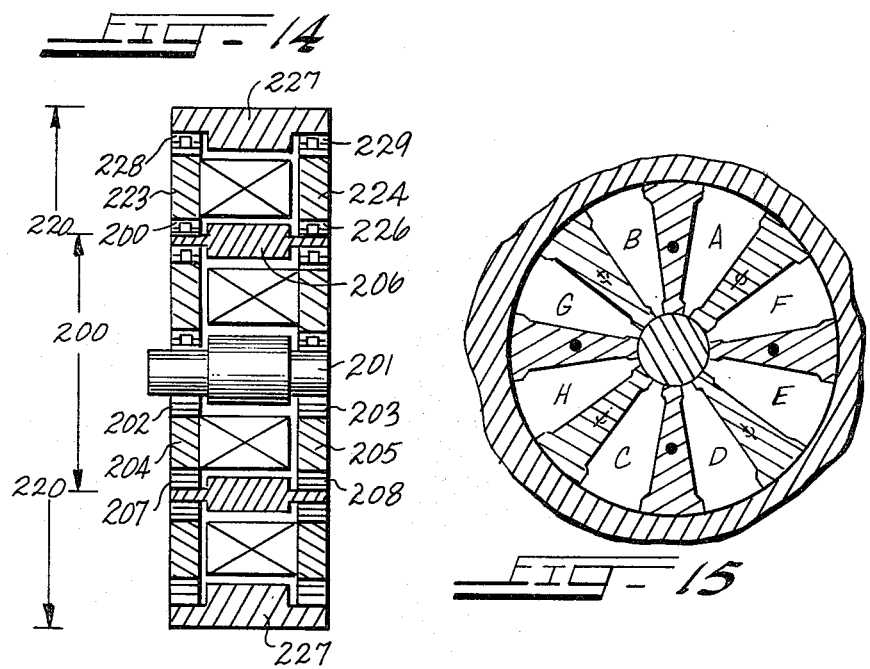
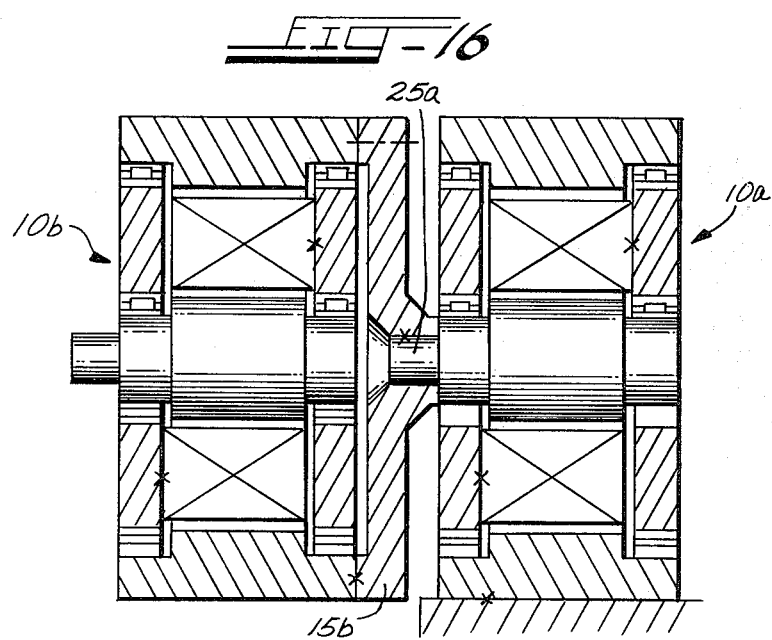

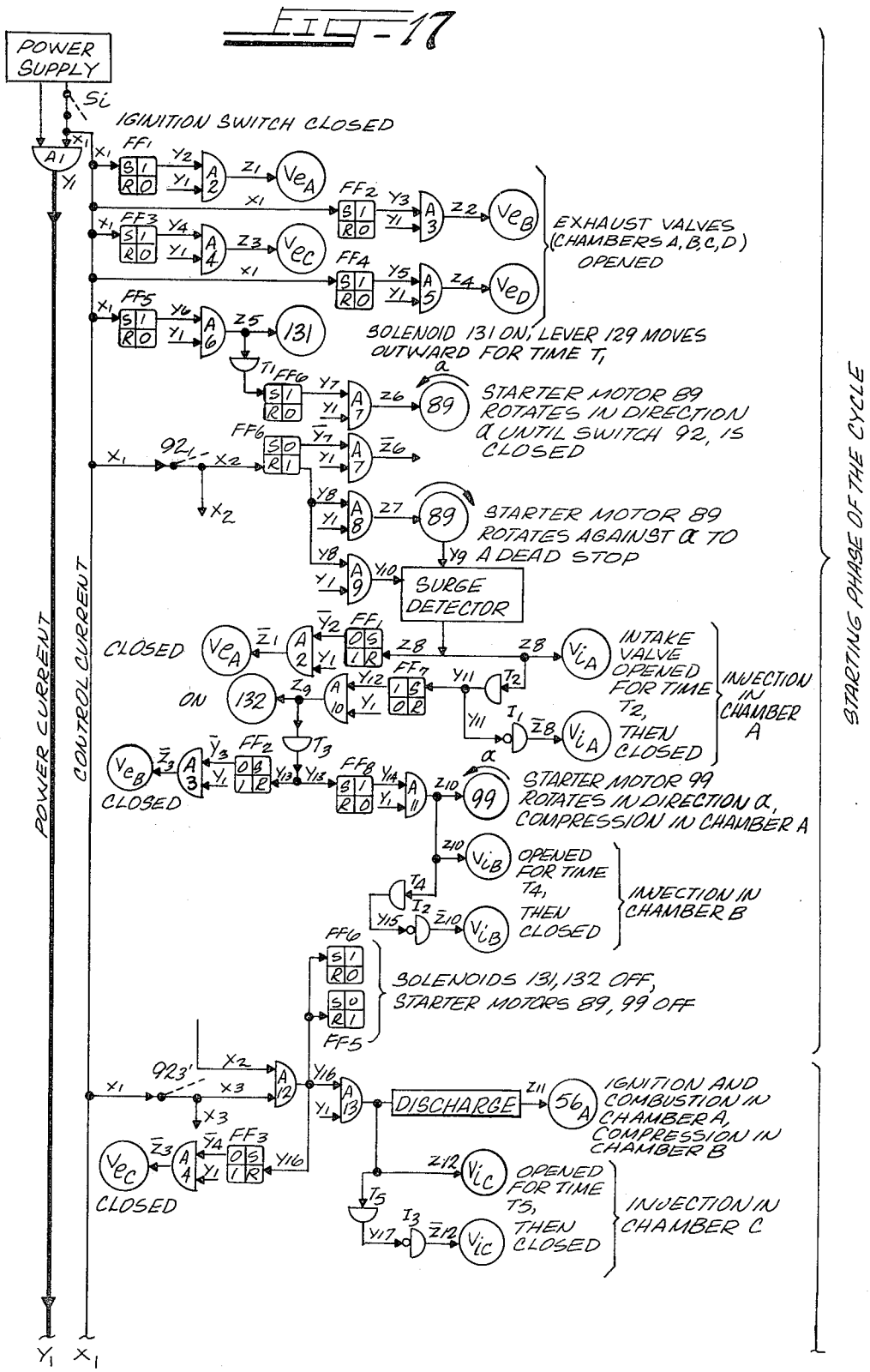

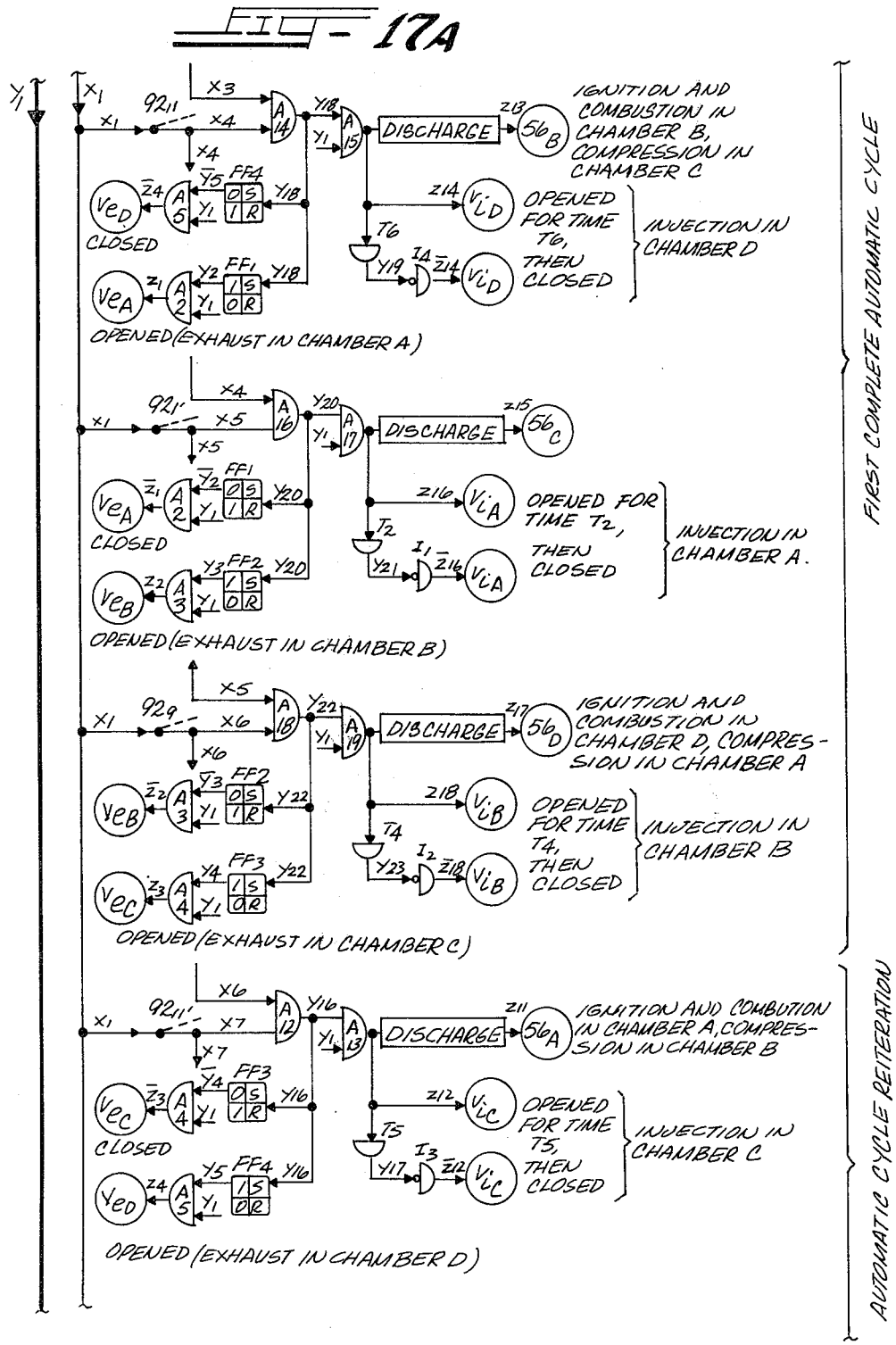

ROTARY INTERNAL COMBUSTION ENGINE

CROSS-REFERENCE

This application is a continuation-in-part of copending application Ser. No. 009,774, filed Feb. 6, 1979, and now abandoned.

FIELD OF THE INVENTION

The present invention relates to internal combustion engines of a rotary configuration.

BACKGROUND

Rotary internal combustion engines are generally known in the art. In order to operate a rotary combustion engine in an efficient configuration, it is desirable to use each of the volumes defined by an adjacent pair of rotor-mounted pistons as a working volume. It is also necessary to prevent the pistons from rotating in a direction opposite to the direction in which the rotors provide useful power if the engine is to avoid the inefficiencies inherent in reciprocating piston configurations. In order to prevent this counterrotation, prior art approaches (e.g., U.S. Pat. Nos. 4,010,716-Minka; and 3,203,405-Sabet) have utilized extremely complex elliptical gear arrangements. Other prior art approaches (e.g., U.S. Pat. Nos. 3,990,405-Kecik and 1,641,911-Tschudi) have used equally cumbersome mechanically operated clutch mechanisms. The prior art (e.g. U.S. Pat. Nos. 3,990,405-Kecik; No. 3,854,457-Taurozzi; No. 1,641,911-Tschudi; and No. 1,273,380-Kuhn) is also characterized by use of a toroidal operating chamber of circular cross section. In addition to the other problems present in the prior art, these configurations require the rotors to be assembled within extremely tight tolerances since the pistons and carrying walls must be a single rigid unit. This is a significant obstacle to economical construction of such devices. Another problem exhibited by the prior art is the limitation imposed by having the intake, ignition, and exhaust means mounted in a fixed housing. This feature requires the timing of the engine to be a function of the position of the rotors with respect to the housing, rather than with respect to one another. The intricate clutch control and timing requirements are the reason that elliptical gear means or intricate clutch means are necessary in order for these engines to function. As a result, none of the prior art engines has proved practical. One exception may be the Wankel engine (e.g., U.S. Pat. No. 2,988,065), which has achieved limited acceptance. However, the Wankel engine presents a completely different approach to the desired end from that presented by the present invention. In addition, the present invention is of much simpler design than the Wankel engine.

One of the principal advantages of the present invention, which distinguishes it from the prior art, is that the timing of the engine is a function of the position of a pair of rotors with respect to one another, independent of their position with respect to the housing. In addition, the intake, ignition, and exhaust means rotate with the work chambers defined between adjacent pistons carried by the rotors. As a result of these innovations, the pistons are free to run in the chamber without any gears or levers coupling the pistons to one another, to the drive shaft, or to a clutch mechanism. Power is extracted and flyback is prevented through the use of self-activating one way clutch mechanisms between each rotor and the drive shaft and between each rotor and the housing. As a result, the only gears which are necessary are for the starting function. Therefore, the present invention presents a simple modular design which possesses far greater flexibility than any of the prior art. While the use of one-way clutches is known in the art (e.g., U.S. Pat. Nos. 1,641,911-Tschudi and 1,273,380-Kuhn), it is the unique combination of the use of one way clutches both for flyback supression (e.g., between the rotors and the housing in one preferred embodiment) and for power extraction (e.g., between the rotors and the drive shaft in the same preferred embodiment), combined with the rotating intake, ignition and exhaust means, which permits the pistons in the present invention to run free of any gearing or mechanically triggered clutch mechanisms necessary to perform these functions in the prior art.

SUMMARY OF THE INVENTION

The present invention is a new form of rotary internal combustion engine which maximizes the application of its displacement to power producing operations. The principal components of the preferred embodiment of the present invention are: a drive shaft; a pair of spaced rotors mounted on the drive shaft and each having at least a pair of arcuate pistons mounted on piston pins parallel to the drive shaft, each piston of each pair being positioned diametrically opposite one another so that, when the two rotors are mounted on the drive shaft by means of two inner one-way clutch mechanisms, the pair of pistons of one rotor are interdigitated with the pair of pistons of the other rotor; an annular housing connected to the outer edge of the two rotors through two outer one way clutch mechanisms, so that an annular operating chamber is defined by the drive shaft, the inner faces of the rotors, and the inner surface of the annular housing, the operating chamber being divided into four work chambers by the four interdigitated pistons; and two endplates mounted on the housing at the exterior face of the rotors, and which supply the intake, ignition, and exhaust requirements of each work chamber by means of annular grooves in the face of the endplates which communicate with the work chambers by means of ports in the rotors, the ports being aligned with the grooves.

Since a pair of diametrically opposed pistons are mounted on the same rotor of a pair of rotors, a forced increase in the volume of a work chamber causes a corresponding increase in the volume of the opposite work chamber, and a corresponding decrease in the volume of each of the two adjacent work chambers. The inner one way clutch mechanisms are both aligned so as to permit the drive shaft to be rotated by the rotors in a specified direction. The outer one way clutch mechanisms are both aligned so as to permit the rotors to rotate with respect to the housing in the same specified direction and to preclude rotation of the rotors in the opposite direction.

The cycle of operation commences with ignition of a compressed fuel-air mixture in one work chamber, causing that work chamber to expand. The piston which forms the leading face of the work chamber is free to rotate under the force of the expansion since the outer one way clutch of its rotor will not lock against the housing when it moves in that direction. The piston which defines the trailing face of this work chamber is prevented from counterrotating with respect to the housing by the corresponding outer one way clutch.

However, the inner one way clutch associated with the rotor of the leading piston will lock against the drive shaft when the leading piston moves, causing the drive shaft to rotate along with the leading piston and thereby converting the energy of the combustion into rotational energy.

The forced expansion of the first work chamber causes a corresponding increase in the volume of the diametrically opposite work chamber, facilitating injection of a fuel-air mixture into that work chamber; and also causes a reduction in the volume of the two adjacent work chambers, facilitating compression of a fuel-air mixture in one chamber and exhaust of combustion products from the other chamber.

Thus, at any given moment, each of the four work chambers is in one of the four states of intake, compression, combustion-expansion, or exhaust. The forced expansion of the work chamber in the combustion-expansion stage causes each of the work chambers to proceed to the next step of the four stroke cycle.

Thus, the present invention provides a new type of rotary internal combustion engine in which the cycle of the engine is independent of the positions of the piston assemblies and of the drive shaft with respect to the housing. This permits operation of the engine in a free running configuration in which counterrotation of the pistons is suppressed and power is transmitted to the drive shaft through the use of one way clutch mechanisms, thereby eliminating the need for complex clutch actuation gears, or other cumbersome means for preventing counterrotation of the pistons and for transmitting power to a drive shaft.

The present invention also provides a new type of rotary internal combustion engine, the configuration of which is readily adaptable to operation with a stationary housing and a rotating drive shaft; a stationary shaft and a rotating housing; or one stationary carrying wall and one rotating carrying wall.

In addition, the present invention provides a new type of rotary internal combustion engine, the operating unit of which is modular in nature so as to be readily adaptable to combination with other modules in concentric, series, or parallel configurations, depending on the requirements of the particular application.

The new type of rotary internal combustion engine provided by this invention has an operating chamber which is a torroid of rectangular cross section, the pistons are arcuate with rectangular axial cross sections, and the pistons are rotatably mounted on rotors via piston pins parallel to the drive shaft of the engine so as to provide efficient sealing between the pistons and the operating chamber through the use of interlocking right angle semirings.

The rotary internal combustion engine also is suitable for operation in either an Otto Cycle or a Diesel Cycle without significant structural modification.

These and other aspects of the invention are hereinafter presented by way of illustration and not limitation by the following detailed description of the preferred embodiments of the invention.

DRAWINGS

FIG. 2 is a partially cross-sectional view taken substantially along line 2—2 shown in FIGS. 3 and 4;

FIG. 3 is a cross-sectional view taken substantially along line 3—3 shown in FIG. 1;

FIG. 4 is a broken cross-sectional view taken substantially along line 4—4 shown in FIG. 1;

FIG. 5 is a fragmentary detail cross-sectional view of an exemplary intake/ignition/exhaust assembly of the preferred embodiment shown in FIGS. 1 through 4;

FIG. 6 is a fragmentary detail cross-sectional view of a spark plug assembly taken substantially along line 6—6 shown in FIG. 5;

FIG. 7 is a fragmentary detail view of a typical piston of the preferred embodiments of the present invention, showing the piston sealing ring assembly;

FIG. 8 is a fragmentary cross-sectional view of a piston sealing ring assembly taken substantially along line 8—8 in FIG. 7;

FIG. 14 is a semi-schematic view of two engine modules, one of which serves as the shaft of another;

FIG. 15 is a semi-schematic view of another alternative embodiment of the present invention;

FIG. 16 is a semi-schematic view of two engine modules connected in series;

FIGS. 17 and 17A are a combined schematic circuit diagram of a system for controlling the starting and cycling of the engine.

DETAILED DESCRIPTION

Figure 1:
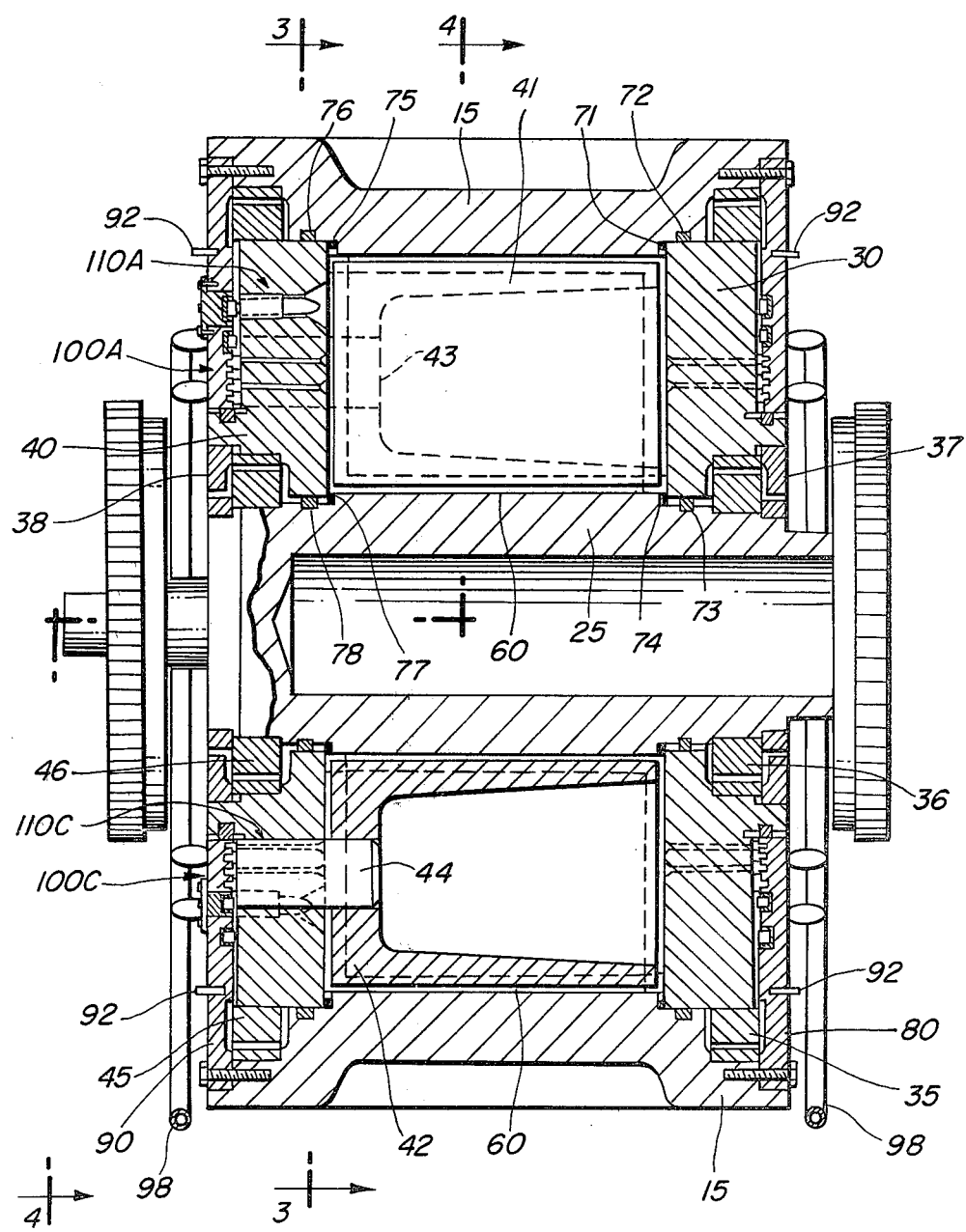
FIG. 1 is a partially cross-sectional view taken substantially along line 1—1 shown in FIGS. 3 and 4 of the preferred embodiment of the present invention in the form of a fixed housing and rotating drive shaft engine adapted to operate by means of the Otto Cycle for an internal combustion engine.

With reference to FIGS. 1 and 2, the first preferred embodiment of the invention has four principal components: a fixed annular housing 15, a drive shaft 25, and two rotor assemblies mounted on drive shaft 25 in spaced alignment for rotation relative to annular housing 15. The first rotor assembly (shown on the right in FIGS. 1 and 2) comprises a first annular carrying wall 30 which supports a first pair of diametrically opposed piston pins 33 and 34, upon which pistons 31 and 32 are respectively rotatably seated. Similarly, the second rotor assembly (appearing on the left in FIGS. 1 and 2) comprises a second annular carrying wall 40 which supports a second pair of diametrically opposed piston pins 43 and 44, upon which a second pair of pistons 41 and 42 are respectively rotatably mounted. Pistons 31, 32, 41 and 42 are of generally rectangular shape in axial cross section (as shown in FIGS. 1 and 2) and are of arcuate shape in transverse cross section (as shown in FIGS. 3 and 4). Piston pins 33, 34, 43 and 44 are parallel to drive shaft 25.

Figure 9:
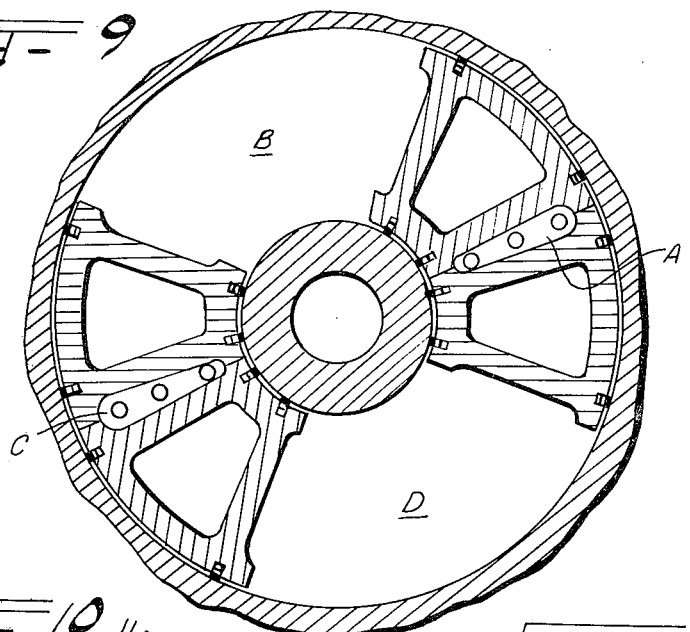
FIG. 9 is a diagrammatic view of the engine at the end of a stroke.

Carrying walls 30 and 40, drive shaft 25, and the inner surface of annular housing 15 define an operating chamber 50 (see FIG. 4) which is a toroidal volume of generally rectangular cross section. Circular outer sealing rings 71 and 72 provide a seal between carrying wall 30 and annular housing 15, and circular inner sealing rings 73 and 74 provide a seal between drive shaft 25 and carrying wall 30. Similarly, circular outer sealing rings 75 and 76 provide a seal between carrying wall 40 and annular housing 15, and circular inner sealing rings 77 and 78 provide a seal between drive shaft 25 and carrying wall 40. Thus, chamber 50 is made substantially airtight, except for intake and exhaust valves hereinafter described in detail. Chamber 50 is divided by pistons 31, 32, 41 and 42 into work chambers A, B, C and D as shown in FIGS. 3, 4 and 9. Since pistons 31, 32, 41 and 42 are free to rotate on their respective piston pins 33, 34, 43 and 44, they can move as necessary to seat and seal piston sealing ring assemblies 60 against the walls of chamber 50. This avoids the necessity of fabricating the rotor-piston assembly as a prealigned unit. Thus, the present invention is less complicated and hence less expensive to manufacture. Piston sealing ring assemblies 60 are hereinafter described in detail in connection with FIGS. 7 and 8.

Carrying wall 30 is operatively connected to annular housing 15 through outer one way clutch 35. Similarly, carrying wall 40 is operatively connected to annular housing 15 through outer one way clutch 45. Carrying wall 30 is operatively connected to drive shaft 25 through inner one way clutch 36. Similarly, carrying wall 40 is operatively connected to drive shaft 25 through inner one way clutch 46. In the preferred embodiments of the present invention, one way clutches 35, 36, 45 and 46 are in the form of two concentric rings, with tapered notches cut into the inner ring, and rollers disposed in the notches, as shown in FIG. 3. This form of one way clutch is well known in the art and allows for movement of the inner clutched part in the direction of the taper in the notches (i.e., in the direction of arrow "a" in FIG. 3) but not in the opposite direction. The outer rings for outer one way clutches 35 and 45 are integral with annular housing 15, and the notched inner rings are integral with carrying walls 30 and 40, respectively. The outer rings for inner clutches 36 and 46 are integral with carrying walls 30 and 40, respectively, and the notched inner rings are integral with drive shaft 25. Outer one way clutches 35 and 45 are both oriented in the direction shown in FIG. 3 so that neither carrying wall 30 nor carrying wall 40 (and, therefore, neither rotor assembly) can rotate against the direction of the arrow "a" with respect to annular housing 15. However, both rotor assemblies are free to turn in the direction of arrow "a" with respect to annular housing 15. Inner one way clutches 36 and 46 are also both oriented in the direction shown in FIG. 3 so that when either rotor assembly moves in the direction of arrow "a", the corresponding inner one way clutch (36 or 46) locks the corresponding carrying wall (30 or 40) to the drive shaft 25 in order to impart rotation to drive shaft 25 in the direction of arrow "a". Endplates 80 and 90 hold outer one way clutches 35 and 45 in place and provide intake, ignition, and exhaust for work chambers A, B, C and D through ports in carrying walls 30 and 40 as hereinafter described. The inner one way clutches 36 and 46 are held in place by end ring assemblies 37 and 38.

As shown in FIG. 1, endplates 80 and 90 each have six annular concentric channels 100. Three of these twelve channels (designated 101, 102, and 103, see FIG. 5) are associated with each of the four work chambers (A, B, C and D) of the engine. Channels 101, 102 and 103, respectively, supply the ignition, intake, and exhaust requirements of each work chamber by means of four sets of ports 110A, 110B, 110C, and 110D through carrying walls 30 and 40 as shown in FIGS. 1, 2 and 5. The intake and exhaust requirements of the channels are supplied in turn by a system of pipes 98 connected to appropriate carburetion and exhaust means (not shown). Each set of ports 110 includes ignition, intake, and exhaust ports 111, 112 and 113, respectively (see FIGS. 3, 4 and 5).

A detail view of the annular channels 100 in endplate 80 (serving chambers B and D), along with the portion of carrying wall 30 which contains the three ports 110B which serve chamber B, is shown in FIGS. 5 and 6. Similarly, endplate 90 contains channels 100 serving chambers A and C via ports 110A and 110C through carrying wall 40. The view shown in FIG. 5 corresponds to the upper right hand portion of the view shown in FIG. 2. The other three port-channel assemblies are substantially identical to the one shown in FIGS. 5 and 6, and therefore corresponding detail views are not provided.

FIG. 5 shows ports 111B, 112B and 113B, corresponding to spark plug 56B, the work chamber B fuel intake port, and the work chamber B exhaust port, respectively. Spark plug 56B is held against a commutator strip 58B, which runs along insulated channel 101B, by a compressed spring 57B. Thus, spark plug 56B remains in contact with the commutator strip 58B as carrying wall 30 rotates. Channel 101D incorporates commutator strip 58D which provides current to the spark plug for chamber D (not shown) in a similar manner. Commutator strip 58B is connected to a conventional ignition system via appropriate conventional wiring (not shown).

Intake channel 102B is supplied with an fuel-air mixture through an appropriately timed conventional carburetion or fuel injection means (not shown). The intake valves for chambers A, B, C and D are represented as $V_{iA}$, $V_{iB}$, $V_{iC}$ and $V_{iD}$, respectively, in the schematic diagram of FIG. 17. Intake port 112B, in turn, supplies fuel-air mixture to chamber B through backflow valve 122B disposed in intake port 112B. The purpose of backflow valve 122B is to keep combustion products out of the intake channel 102B. Intake channel 102D performs the same function for chamber D. Combustion products are exhausted through exhaust channel 103B via exhaust port 113B. Similarly, exhaust channel 103D carries the exhaust of chamber D. The exhaust valves for chambers A, B, C and D are represented as $V_{eA}$, $V_{eB}$, $V_{eC}$ and $V_{eD}$, respectively, in the schematic diagram of FIG. 17. Circular sealing rings 91 prevent crossover between any of the intake channels 102 or exhaust channels 103, and isolate commutator strips 101 from intake and exhaust gases. In like manner, the second carrying wall 40 and endplate 90 incorporate spark plugs, ports, and channels to service chambers A and C.

In the position shown in FIG. 5, spark plug 56B is lined up with access port 81B. When bolts 82B are removed, the access port 81B, including a portion of commutator strip 58B and insulated channel 101B can be removed, thus allowing access to the spark plug for inspection and replacement.

In the preferred embodiment of the present invention, the preferred location of the spark plug, intake, and exhaust ports 111, 112 and 113, respectively, is along the center line just ahead of the surface formed by the leading edge of each piston 31, 32, 41 and 42 (see FIG. 4). In this way, if two pistons meet at the point of combustion (as hereinafter described), high compression can be obtained, and the spark can be centered in the small combustion volume formed by the two piston faces (see FIG. 9).

All circular sealing rings (71–78 and 91), located between the housing 15 and the carrying walls 30 and 40, between the carrying walls 30 and 40 and drive shaft 25, and between endplates 80 and 90 and carrying walls 30 and 40 are of conventional design (see FIGS. 1, 2 and 5). The piston sealing rings 60 which seal the pistons 31, 32, 41, and 42 against the inside of operating chamber 50 are shown in FIGS. 7 and 8. Each ring is composed of two pairs of interlocking right angle semirings 61 seated in a groove running around the sealing edge of the piston and disposed so that the jointed corners of the first pair of semirings are protected by the unjointed corners of the second pair of semirings, as shown in FIG. 7. Both ends of each semiring are of reduced thickness to permit the first member of each pair of semirings to overlap with its counterpart. The sealing function of piston sealing rings 60 can be improved by providing springs 68 in the grooves of the pistons 31, 32, 41 and 42, in order to hold the piston sealing rings 60 firmly against the inner surface of chamber 50 and to compensate for wear of sealing rings 60.

As shown in FIG. 2, starter motor 89 is connected to a pinion gear 121 which is, in turn, coupled through idler gear 123 to drive gear 125. Drive gear 125 incorporates a bearing 127 which permits drive gear 125 to turn freely on shaft 25. Drive gear 125 also incorporates a lever 129 which is actuated by a solenoid 131. When solenoid 131 is actuated, lever 129 protrudes so as to engage a pin 133 which is mounted on the lip of carrying wall 30 as hereinafter described. Similarly, starter motor 99 is connected to pinion gear 122 which is, in turn, coupled through idler gear 124 to drive gear 126. Drive gear 126 incorporates a bearing 128 which permits drive gear 126 to turn freely on shaft 25. Drive gear 126 also incorporates a lever 130 which is actuated by a solenoid 132. When solenoid 132 is actuated, lever 130 protrudes so as to engage a pin 134 which is mounted on the lip of carrying wall 40 as hereinafter described.

The ignition timing, intake timing, and exhaust valve timing functions can all be controlled by magnetic sensing of the carrying wall positions through appropriate sensors, such as magnetic reed switches 92 (see FIGS. 1 and 2) mounted in endplates 80 and 90. As an example, FIG. 4 shows twelve reed switches mounted in each of the endplates 80 and 90. The twelve reed switches in endplate 90 are numbered $92_1$ through $92_{12}$, as illustrated in FIG. 4; and the corresponding twelve reed switches in endplate 80 are numbered $92_{1'}$ through $92_{12'}$. In the preferred embodiment, the reed switches for each carrying wall are uniformly spaced apart circumferentially, and they determine carrying wall position by sensing the position of permanent magnets 93 and 94 (see FIG. 2) located in carrying walls 30 and 40, respectively. Other means, such as optical detection means or mechanical means, can also be used to determine the relative position of the carrying walls in order to time the engine functions. Based on the relative positions of the carrying walls, suitable conventional control circuitry, as illustrated in FIG. 17, can actuate the spark plugs and solenoid valves for intake and exhaust to control operation of the engine. Regardless of whether this or some other timing apparatus is used, the timing functions are based solely on the relative positions of the two rotor assemblies and are independent of the positions of the rotor assemblies relative to the housing and the drive shaft. By sensing the positions of the rotors with respect to the housing, the timing and control circuitry can readily calculate the relative position of the rotors to one another, using the housing as a frame of reference from which to make the calculation.

With reference to FIGS. 3 and 4, the Otto Cycle operation of the preferred embodiment of the present invention will first be described in the context of the mechanical operation of the engine. While it is possible to initiate the engine cycle with any work chamber, for convenience, the description of the engine will be started with work chamber A. It is to be understood that all references to ignition, exhaust, and intake refer to operations performed through the annular channels 100 and ports 110 serving the work chamber (A, B, C or D) in question, and controlled by an appropriate timing means such as the timing control means described below and illustrated in FIG. 17. All events referred to in the same paragraph below occur substantially simultaneously, except as otherwise noted.

The ignition switch $S_i$ (see FIG. 17) is closed, energizing solenoid 131 which moves lever 129 to the outward position to enable lever 129 to engage pin 133, and energizes solenoids of the exhaust valves $V_{eA}$, $V_{eB}$, $V_{eC}$ and $V_{eD}$ to open the exhaust valves. Starter motor 89 is then caused to rotate in the direction indicated by arrow "a" in FIG. 3. This causes drive gear 125 to rotate in the direction of arrow "a", thereby bringing lever 129 into engagement with pin 133. Starter motor 89 continues to rotate, thereby causing carrying wall 30 to rotate in the direction of arrow "a" via pinion gear 121, idler gear 123, drive gear 125, lever 129, and pin 133. Note that shaft 25 is also caused to rotate in the direction of arrow "a" by the operation of inner one way clutch 36 associated with carrying wall 30.

When carrying wall 30, for example, is in the position shown in FIG. 3 (i.e., with piston 31 at the 12 o'clock position), the reed switch $92_1$ is closed, and the direction of rotation of starter motor 89 is reversed. Lever 129 leaves contact with pin 133, and drive gear 125 continues to rotate against the direction of arrow "a" under the control of starter motor 89. When lever 129 makes contact with the other side of pin 133 after drive gear 125 has rotated almost 360 degrees, starter motor 89 stops because outer one way clutch 35 will not permit carrying wall 30 to rotate against the direction of arrow "a" with respect to the housing 15. However, starter motor 89 is not turned off, and thus carrying wall 30 and pistons 31 and 32 are locked in the position shown in FIG. 3 as long as starter motor 89 remains on.

The increased current to starter motor 89 which is caused by the stopping of the starter motor 89 (stall current) is detected by a surge detector of the timing circuitry. The timing circuitry activates a solenoid valve $V_{iA}$ (see FIG. 18) to inject a measured fuel-air mixture into work chamber A via the intake channel, backflow valve, and intake port corresponding to work chamber A. When injection is complete, the solenoid valve $V_{iA}$ is closed, solenoid 132 is energized, moving lever 130 outward to engage pin 134, and the timing circuitry activates starter motor 99, causing it to rotate in the direction of arrow "a", and deenergizes the solenoid of the exhaust valve $V_{eB}$, causing it to close. At the same time, intake valve $V_{iB}$ opens for injection. As drive gear 126 continues to rotate, carrying wall 40 is rotated in the direction of arrow "a", bringing piston 41 closer to now immobile piston 31, thus compressing the fuel-air mixture to work chamber A. Note that piston 31 (which along with piston 41 forms work chamber A)

cannot back away from piston 41 under the pressure of the compressed fuel-air mixture, since carrying wall 30 on which piston 31 is mounted is held in place by starter motor 89 which is still on. At the same time work chamber A is compressed by starter motor 99, the volume of work chamber B increases, since piston 31 is the trailing wall of work chamber B, and piston 42 is held 180 degrees away from piston 41 by carrying wall 40. This facilitates the injection of a full charge of the fuel-air mixture into work chamber B, and as soon as this is done, the intake valve $V_{iB}$ is closed.

When a full charge has been injected into work chamber B and work chamber A is under maximum compression, the reed switch $92_{3'}$ is closed, and the timing circuitry applies a suitable current to the spark plug 56A in work chamber A. Simultaneously, exhaust valve $V_{eC}$ is closed and intake valve $V_{iC}$ is opened, starter motors 89 and 99 and solenoids 131 and 132 are turned off, and levers 129 and 130 of solenoids 131 and 132 are retracted to their inward positions so as to disengage pins 133 and 134. (Note that while the engine is now started and the starter motors 89 and 99 are no longer used, the starter motors 89 and 99 and/or their associated gears can be used for the generation of current to run the engine or other apparatus.) The current applied to the spark plug in work chamber A ignites the fuel-air mixture, causing an explosion and rapid expansion of the combustion products which tends to force pistons 31 and 41 away from each other. Outer one way clutch 45 locks carrying wall 40 and piston 41 in place against the force of the explosion, since the force on piston 41 is against arrow "a", and outer one way clutch 45 does not permit carrying wall 40 to rotate against the direction of arrow "a". However, piston 31 is free to and is forced to move in the direction of arrow "a" by the explosion. Piston 31 is free to move in the direction of arrow "a" with respect to the housing 15 since outer one way clutch 35 which couples carrying wall 30 to housing 15 does not lock when carrying wall 30 moves in the direction of arrow "a". Inner one way clutch 36 which couples carrying wall 30 to drive shaft 25 does lock when carrying wall 30 moves in the direction of arrow "a" with respect to drive shaft 25. Therefore, the explosive force of the combustion in work chamber A is transmitted to drive shaft 25 through piston 31 and carrying wall 30. Note that locked carrying wall 40 does not restrict the motion of drive shaft 25, since the inner clutch 46 which couples carrying wall 40 to drive shaft 25 does not lock when the drive shaft 25 moves in the direction of arrow "a" with respect to carrying wall 40.

The expansion of the volume of work chamber A causes a commensurate reduction of the volume of work chamber B as piston 31 advances in the direction of arrow "a", since pistons 41 and 42 are coupled together. The pressure caused by compression of the fuel-air mixture in work chamber B will not cause piston 42 to move away from piston 31 as piston 31 approaches, since the back pressure on piston 41 from the explosion in work chamber A has locked carrying wall 40 (and therefore piston 42) in place. Since the volume of work chamber A was increased by the combustion, work chamber C will increase in volume as well, because these two cylinders expand and contract in tandem. This facilitates injection of a fuel-air mixture into work chamber C, which takes place simultaneously with compression of the charge in work chamber B and expansion in volume of work chamber A caused by the combustion.

When the expansion of work chamber A reaches its peak, and work chamber B is under maximum compression, the reed switch $92_{11}$ is closed, and the timing circuitry applies a suitable current to the spark plug 56B in work chamber B. The consequent rapid expansion of the ignited gases in work chamber B applies a force against the direction of arrow "a" on piston 31. Piston 31 cannot move in this direction with respect to housing 15 since outer one way clutch 35 does not permit carrying wall 30 upon which piston 31 is mounted to move against the direction of arrow "a" with respect to housing 15. Piston 42 is free to move under the force of the explosion in the direction of arrow "a" with respect to the housing since outer clutch 45 does not restrict the movement of carrying wall 40 in the direction of arrow "a". The motion of piston 42 in the direction of arrow "a" is transmitted to drive shaft 25 since inner one way clutch 46 locks carrying wall 40 to drive shaft 25 when carrying wall 40 moves in the direction of arrow "a". Carrying wall 30 does not limit the motion of drive shaft 25 during this portion of the cycle since inner one way clutch 36 does not lock carrying wall 30 to drive shaft 25 when drive shaft 25 moves in the direction of arrow "a".

As above, the expansion in volume of work chamber B compresses the charge which was injected into work chamber C during the above-described combustion-expansion in work chamber A. The expansion in volume of work chamber B also reduces the volume in work chamber A, thereby forcing out the combustion products which remain in work chamber A. Finally, the expansion in the volume of work chamber B causes a corresponding increase in the volume of work chamber D, which facilitates the injection of a fuel-air mixture into that chamber.

At this point, each of the four work chambers A, B, C and D is at one of the four principal steps in the Otto Cycle as shown in FIG. 9. Work chamber A has just exhausted its combustion products and is ready to receive a fresh fuel-air mixture. Work chamber B has just finished the work stroke following ignition of the fuel-air mixture and is ready to exhaust combustion products as its next step. Work chamber C has just undergone compression, and its fuel-air mixture is ready to be ignited. Work chamber D has just received a fresh fuel-air mixture and is ready to be compressed.

From this point on, each work chamber proceeds through each of the four steps of the conventional Otto Cycle of injection, compression, ignition and work stroke, and exhaust as each adjacent pair of pistons moves apart, together, apart, and together again. Thus, the entire internal volume of the engine, except the space taken up by the pistons themselves, is constantly actively proceeding through some step in the Otto Cycle.

With reference to FIG. 17, the timing circuitry for controlling cycling of the engine will now be described. The circuitry is shown by way of example only, since other techniques can be used for controlling the starting and automatic cycling of the engine. For example, the control circuit shown in FIG. 17 includes and-gates and flip-flops although other circuit elements could be used to provide the desired control signals.

In the illustrated circuit diagram, letter X is being used to designate low power control signals, letter Y for intermediate control and power signals, and letter Z for high power output signals.

The starting phase of the engine cycle is initiated by closing the ignition switch $S_i$, which supplies a control current $X_1$ to and-gate $A_1$ and to all the first stage elements of the control circuit. Power current is being permanently supplied to the and-gate $A_1$, so the power current $Y_1$ appears on the output side of the and-gate $A_1$ as soon as the control signal $X_1$ is supplied to the and-gate $A_1$, e.g., as soon as the ignition switch $S_i$ is closed; and the power current $Y_1$ is being supplied to the corresponding elements of the control circuit (as shown in FIG. 17) all the time that the ignition switch $S_i$ is being held closed.

The control signal $X_1$, during the starting phase of the cycle, initiates simultaneous opening of the exhaust valves $V_{eA}$, $V_{eB}$, $V_{eC}$ and $V_{eD}$ for venting chambers A, B, C and D, respectively. The control signal $X_1$ sets a flip-flop $FF_1$ which produces a low level power signal $Y_2$ that is supplied to an and-gate $A_2$ along with the power signal $Y_1$ that has already been supplied to the and-gate $A_2$. When these two signals appear, and-gate $A_2$ produces a high level power output signal $Z_1$ that energizes the solenoid for opening the exhaust valve $V_{eA}$. Exhaust valves $V_{eB}$, $V_{eC}$ and $V_{eD}$ are simultaneously opened by similar control means.

At the same time that the exhaust valves are opened, control signal $X_1$ energizes solenoid 131 to move the lever 129 outwardly for a time period $T_1$. Control signal $X_1$ sets a flip-flop $FF_5$ to produce a control signal $Y_6$ which, when combined with control signal $Y_1$ at an and-gate $A_6$, generates a control signal $Z_5$ for energizing solenoid 131. Control signal $Z_5$ also is fed to a time delay module $T_1$ which produces an output pulse after a short time delay. The timed pulse sets a flip-flop $FF_6$ to produce a control signal $Y_7$ which, when combined with control signal $Y_1$ at an and-gate $A_7$, generates a control signal $Z_6$ to energize starter motor 89. This rotates the motor in direction "a", and the lever 129 engages pin 133, causing carrying wall 30 to rotate in the direction "a" until reed switch $92_1$ is closed. When reed switch $92_1$ is closed, a control signal $X_2$ is produced to reset flip-flop $FF_6$, which, in turn, causes control signal $Y_7$ to disappear, causing starter motor 89 to stop rotating in direction "a". At the same time, starter motor 89 begins counterrotating opposite to direction "a". When flip-flop $FF_6$ is reset, it produces a control signal $Y_8$ which, when combined with control signal $Y_1$ at an and-gate $A_8$, generates a control signal $Z_7$ for rotating starter motor 89 in the opposite direction toward a dead stop.

At the same time that starter motor 89 is rotated in the opposite direction, control signal $Y_8$ is supplied to an and-gate $A_9$ to produce a control signal $Y_{10}$ that is fed to a surge detector along with control signal $Y_9$ which is generated after starter motor 89 starts counterrotating. The surge detector produces an output signal $Z_8$ when current in the starter motor increases to a certain level, i.e., when the starter motor has moved to a dead stop. The surge detector output $Z_8$ is fed to the solenoid for intake valve $V_{iA}$ which is opened for a time delay period $T_2$ and then closed. Control signal $Z_8$ triggers a time delay module $T_2$ for producing an output signal $Y_{11}$ after a short time delay required for the intake valve $V_{iA}$ to remain open for injection of the fuel-air mixture in chamber A. After the time delay $T_2$, signal $Y_{11}$ is fed to an inverter $I_1$ that causes the signal $Z_8$ to disappear, closing the intake valve $V_{iA}$.

At the same time that intake valve $V_{iA}$ is opened, exhaust valve $V_{eA}$ for chamber A is closed. Control signal $Z_8$ from the surge detector resets flip-flop $FF_1$ causing control signal $Y_2$ to disappear, which, in turn, causes control signal $Z_1$ to disappear for closing exhaust valve $V_{eA}$.

As intake valve $V_{iA}$ closes, solenoid 132 is energized for moving lever 130 outward to engage pin 134 on carrying wall 40. After the time delay $T_2$, control signal $Y_{11}$ sets a flip-flop $FF_7$ that produces a control signal $Y_{12}$ which triggers an and-gate $A_{10}$ to produce a control signal $Z_9$ that energizes solenoid 132. Control signal $Z_9$ is also fed to a time delay module $T_3$, which, after a short time delay, produces a control signal $Y_{13}$ that sets a flip-flop $FF_8$ for producing a control signal $Y_{14}$ that triggers an and-gate $A_{11}$ for producing a control signal $Z_{10}$ that energizes starter motor 99 for rotating the starter motor in the direction "a". This causes compression in chamber A. At the same time control signal $Z_{10}$ energizes the solenoid for opening intake valve $V_{iB}$ for admitting a fuel-air mixture to chamber B. At the same time that intake valve $V_{iB}$ is opened, exhaust valve $V_{eB}$ for chamber B is closed. Control signal $Y_{13}$ resets flip-flop $FF_2$ which causes control signal $Y_3$ to disappear so that control signal $Z_2$ from and-gate $A_3$ also disappears to close exhaust valve $V_{eB}$.

At the same time that control signal $Z_{10}$ is used to open intake valve $V_{iB}$, it is also used to trigger a time delay module $T_4$ which produces a control signal $Y_{15}$ after a short time delay necessary for allowing the fuel-air mixture to enter chamber B. Control signal $Y_{15}$ triggers an inverter $I_2$ for causing control signal $Z_{10}$ to disappear, thereby closing intake valve $V_{iB}$.

When starter motor 99 rotates the carrying wall 40, work chamber A is compressed and reed switch $92_{3'}$ is closed at maximum compression, which is the proper position for ignition in chamber A. When reed switch $92_{3'}$ closes, a new control signal $X_3$ is generated and supplied to an and-gate $A_{12}$ along with previous control signal $X_2$ produced when reed switch $92_1$ was closed. And-gate $A_{12}$ triggers to produce a control signal $Y_{16}$ which resets flip-flop $FF_5$ and sets flip-flop $FF_6$ for deenergizing solenoids 131 and 132, and turns off starter motors 89 and 99.

The engine now starts operating on the first complete automatic cycle. Control signals $Y_{16}$ and $Y_1$ trigger and-gate $A_{13}$ to produce a control signal $Z_{12}$ that causes a strong high-frequency power discharge pulse $Z_{11}$ to spark plug 56A for producing ignition and combustion in chamber A and compression in chamber B. Simultaneously, control signal $Y_{16}$ resets flip-flop $FF_3$, causing control signal $Y_4$ to disappear. This causes power output signal $Z_3$ to disappear, closing exhaust valve $V_{eC}$ in chamber C. Injection in chamber C is provided at the same time by supplying control signal $Z_{12}$ to the solenoid for opening intake valve $V_{iC}$ in chamber C for allowing injection of a fuel-air mixture in chamber C. Control signal $Z_{12}$ is simultaneously fed to a time delay module $T_5$, and after a time delay sufficient for injection in chamber C, a control signal $Y_{17}$ triggers an inverter $I_3$ for causing control signal $Z_{12}$ to disappear, which closes intake valve $V_{iC}$. At the same time that combustion exists in chamber A, compression exists in chamber B, injection occurs in chamber C, and air is exhausted from chamber D through exhaust valve $V_{eD}$.

Automatic cycling has now started and reed switch $92_{11}$ is closed next, after which a similar timing sequence controls ignition and combustion in chamber B, compression in chamber C, injection in chamber D, and exhaust from chamber A.

Next, reed switch $92_{1'}$ is closed and similar timing controls the next sequence which includes ignition and combustion in chamber C, compression in chamber D, injection in chamber A, and exhaust from chamber B. Following this sequence, reed switch $92_9$ is closed and similar timing controls the next sequence which includes ignition and combustion in chamber D, compression in chamber A, injection in chamber B and exhaust from chamber C.

This completes the first automatic cycle, after which the automatic cycle is constantly repeated by similar timing control techniques.

It should be noted that each ignition occurs when the reed switches are closed in a certain sequence, for example, $92_1$, $92_{3'}$, $92_{11}$, $92_{1'}$, $92_9$, etc. The combination shown in the circuitry diagram of FIG. 17 defines the chosen volume of the compressed fuel-air mixture to be ignited. In the described example, the difference in the angular position of the two rotor assemblies in the ignition moments is two of twelve, or 60 degrees, but this can be one or three as well, with corresponding changes in the control logic. The control circuit is not exclusive, but only provides an example of a desired cycling of the engine. If the chosen position of piston 31 in the described example is not 12 o'clock, but at 11 o'clock, for example, then the sequence of closing the reed switches for producing ignition would be $92_{12}$, $92_{2'}$, $92_{10}$, $92_{12'}$, $92_8$, etc. A variety of suitable combinations of closed reed switches can be provided by one skilled in the art of designing electronic timing circuitry, by means of a proper combination of and-gates and or-gates for example. This variety, however, can be accomplished only due to the annular commutators 58, annular intake-exhaust channels 102, 103, and circumferential disposition of the rotor position sensors 92, which all are important features of the subject invention.

The energy of the combustion is transmitted alternately by carrying walls 30 and 40, through inner one way clutches 36 and 46, respectively, to drive shaft 25. Flyback of the trailing piston of each work chamber as it undergoes combustion is prevented by outer one way clutches 35 and 45. Thus, the present invention functions as a rotary internal combustion engine. The stage of the Otto Cycle that each work chamber is in depends on the relative position of the pistons to one another and does not depend on the position of any piston with respect to the housing 15 or the drive shaft 25. Therefore, combustion will take place at varying positions in the operating chamber 50. This facilitates cooling the engine and will minimize thermal stress on the engine since the heating of the engine caused by combustion will be more even.

One of the major advantages offered by the present invention is its versatility. The engine can be operated on a Diesel Cycle by replacing the spark plug assembly with a conventional diesel fuel injection means. The four stages of the Diesel Cycle for a given cylinder would then be: air injection; compression; fuel injection, ignition, combustion-work stroke, and exhaust. In all other structural aspects, the engine would remain substantially unchanged. In addition, if desired, the direction in which the Otto Cycle or the Diesel Cycle proceeds around the four chambers can be reversed simply by modifying the timing mechanism to perform the injection, ignition and exhaust functions in chamber A, then chamber D, then chamber C, then chamber B, and so on, rather than in the A, B, C, D sequence. The direction of rotation of the engine would remain unchanged since it is determined by the orientation of one way clutches 35, 36, 45 and 46.

Since the engine's operation is solely a function of the relative positions of the pistons, many variations of this preferred embodiment are readily available to suit particular requirements. For example, the drive shaft of the present embodiment can be fixed, and the engine housing can, in effect, rotate around the "drive shaft" without internal modification. In this configuration, the entire engine (except for the drive shaft) functions as a flywheel without the additional weight which would be added if a separate flywheel were attached to the drive shaft.

Figure 10:
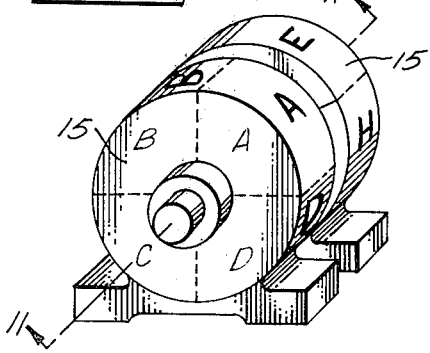
FIG. 10 is a semi-schematic perspective view of two engine modules coaxially arranged and sharing a common shaft.
Figure 11:
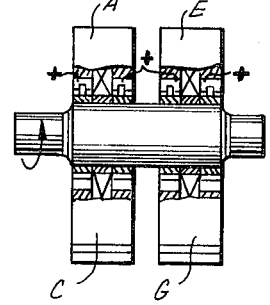
FIG. 11 is a semi-schematic cross-sectional view, partly broken away, taken substantially along line 11—11 in FIG. 10.

Engine power can also be increased by increasing the radial or axial dimensions of chamber 50. The torque of the engine can be increased and made more uniform by positioning two or more modules, such as the one described above, on the same drive shaft (see FIGS. 10 and 11). The + sign in FIG. 11 identifies the ring of a one way clutch that engages the clutch when driven from the view plane. When high torque is not necessary, the fuel supply and ignition for one or more of the additional modules on a given drive shaft could be completely shut down, thus saving fuel and power without impairing the remaining operational modules at all, since the inner one way clutches of the additional modules will not couple the carrying walls of the additional modules to the drive shaft in this situation.

Figure 12:
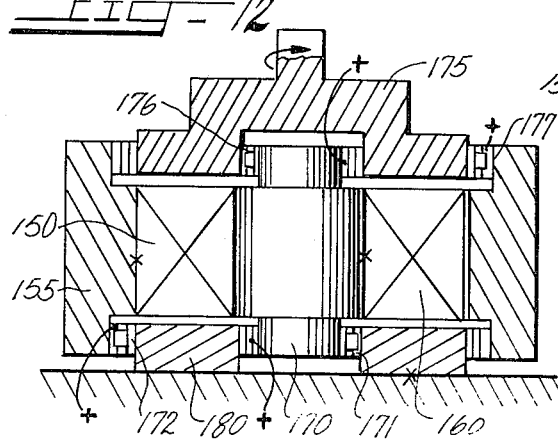
FIG. 12 is a semi-schematic view of an alternative embodiment of the present invention.
Figure 13:
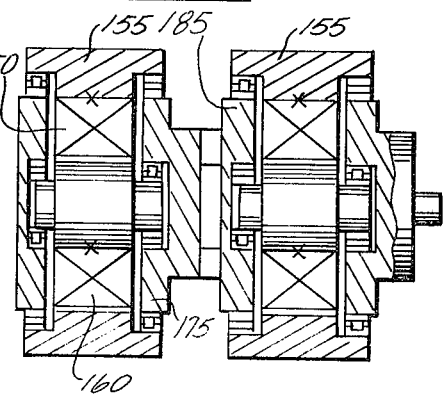
FIG. 13 is a semi-schematic view of two alternative engine modules connected linearly in series.

Another embodiment of the present invention shown in FIG. 12 includes one pair of pistons 150 mounted to the annular housing 155, and the second pair of pistons 160 mounted to the shaft 170. In this configuration, first inner clutch 171 and first outer clutch 172 are both oriented so as to permit shaft 170 and housing 155 to rotate in the same specified direction with respect to end wall 180. Similarly, second inner clutch 176 and second outer clutch 177 are both oriented so as to permit output end wall 175 to rotate in the same specified direction with respect to both shaft 170 and housing 155. Again, the + sign indicates the ring of a one way clutch that engages the clutch when driven from the view plane. Thus, first inner clutch 171 and second outer clutch 177 are oriented in one direction, and first outer clutch 172 and second inner clutch 176 are oriented in the opposite direction. When the clutches which couple the shaft 170 and the housing 155 to each of the end walls 175 and 180 are oriented in this manner, and end wall 180 is held fixed, output can be taken off of end wall 175. As shown in FIG. 13, this configuration is well suited to stacking of engine modules in series, since all that is required is to mate the second or output end wall 175 of a first engine module to the first or input end wall 185 of an identical second engine module.

If high angular velocity of the drive shaft is desired, engine modules in accordance with the present invention can be coupled in series with a drive shaft 25a of a first module 10a coupled to the housing 15B of a second module 10B so that the entire second module rotates at the output velocity of the first drive shaft (see FIG. 16). In this way, the output velocities of two or more modules can be combined additively. An equivalent configuration is illustrated in FIG. 14. An inner engine 200 comprises a shaft 201 which is coupled via a first set of inner one way clutches 202 and 203 to inner carrying walls 204 and 205. Inner carrying walls 204 and 205 are in turn connected to inner housing 206 via a first set of outer one way clutches 207 and 208. This portion of the configuration is substantially identical to the embodiment previously described in detail. Outer engine 220 is similarly configured; however, the carrying walls 223 and 224 of outer engine 220 are coupled to the inner housing 206 of the inner engine 200 (instead of a shaft) via a second set of inner one way clutches 225 and 226. The carrying walls 223 and 224 of outer engine 220 are coupled to the outer housing 227 via outer one way clutches 228 and 229. Thus, for example, if outer housing 227 is held stationary, the outer carrying walls 223 and 224 will cause inner housing 206 to rotate, just as the shaft was caused to rotate in the principal embodiment previously described. However, when inner housing 206 is rotated under the influence of outer engine 220, this will have the effect of rotating the entire inner engine 200. Thus, the velocity of the shaft 201 with respect to the inner housing 206 caused by operation of the inner engine 200 will be added to the velocity of the inner housing 206 with respect to the outer housing 227 caused by operation of the outer engine, to yield an increased net output for the combined engine.

Another embodiment (shown in FIG. 15) utilizes eight pistons. Four of the pistons are mounted in an equally spaced configuration on each of two carrying walls. The housing, shaft, and pistons are dimensioned so as to divide the operating chamber of the engine into eight work chambers. The rest of the engine would be substantially identical to the principal embodiment of the subject invention. The subject invention also encompasses an engine of the same basic design having one piston per carrying wall. Such an engine would require the assistance of a starter motor or other device for two of the four strokes of the combustion cycle. It can readily be seen that the subject invention contemplates a variety of piston and engine configurations with an even number of pistons.

While preferred embodiments of the invention have been illustrated and described, it is to be understood that the invention is not to be limited to the precise constructions herein disclosed, and the right is reserved to all changes and modifications coming within the scope of the invention as defined in the appended claims.

I claim:

1. A rotary internal combustion engine comprising:
a housing;
a shaft journaled in the housing such that one of the shaft and the housing is free to rotate with respect to the other;
a pair of carrying walls mounted on the shaft within the housing, the carrying walls being positioned with respect to the housing and the shaft so as to define a toroidal operating chamber between them;
at least one piston carried by each carrying wall, so that the operating chamber is divided into discrete working chambers by the pistons;
outer one way clutch means through which the carrying walls are operatively mounted with respect to the housing, the outer one way clutch means being oriented so as to permit both of the carrying walls to rotate only in one given direction with respect to the housing;
inner one way clutch means through which the carrying walls are operatively mounted with respect to the shaft, the inner one way clutch means being oriented so as to permit the shaft to rotate in the same given direction with respect to the carrying walls;
intake means for providing fuel and air to each of the work chambers;
means for igniting the fuel in each of the work chambers;
exhaust means for venting the combustion products from each of the work chambers; and
timing means for controlling the intake means, the means for igniting the fuel, and the exhaust means solely as a function of the relative position of the carrying walls to each other.

2. A rotary internal combustion engine comprising:
a housing;
a shaft journaled in the housing such that one of the shaft and the housing is free to rotate with respect to the other;
a pair of carrying walls mounted on the shaft within the housing, the carrying walls being positioned with respect to the housing and the shaft so as to define a toroidal operating chamber between them;
at least one piston carried by each carrying wall, so that the operating chamber is divided into discrete working chambers by the pistons;
outer one way clutch means having their outer members immovably connected to the housing and with their inner members each immovably connected to a respective carrying wall, the outer one way clutch means being oriented so as to permit both of the carrying walls to rotate only in one given direction with respect to the housing;
inner one way clutch means having their inner members immovably connected to the shaft and with their outer members each immovably connected to a respective carrying wall, the inner one way clutch means being oriented so as to permit the shaft to rotate in the same given direction with respect to the carrying walls;
intake means for providing fuel and air to each of the work chambers;
means for igniting the fuel in each of the work chambers;
exhaust means for venting the combustion products from each of the work chambers; and
timing means for controlling the intake means, the means for igniting the fuel, and the exhaust means solely as a function of the relative position of the carrying walls to each other.

3. A rotary internal combustion engine comprising at least one engine module which further comprises:
a housing;
a shaft journaled in the housing such that one of the shaft and the housing is free to rotate with respect to the other;
a pair of carrying walls mounted on the shaft within the housing, the carrying walls being positioned with respect to the housing and the shaft so as to define a toroidal operating chamber between them;
a pair of pistons carried by each carrying wall and disposed opposite one another, so that the pistons are interdigitated and the operating chamber is divided into discrete work chambers by the interdigitated pistons;
outer one way clutch means through which the carrying walls are operatively mounted with respect to the housing, the outer one way clutch means being oriented so as to permit both of the carrying walls to rotate only in one given direction with respect to the housing;
inner one way clutch means through which the carrying walls are operatively mounted with respect to the shaft, the inner one way clutch means being oriented so as to permit the shaft to rotate in the same given direction with respect to the carrying walls;

intake means for providing fuel and air to each of the work chambers;

means for igniting the fuel in each of the work chambers;

exhaust means for venting the combustion products from each of the work chambers; and timing means for controlling the intake means, the means for igniting the fuel, and the exhaust means solely as a function of the relative position of the carrying walls to each other.

4. A rotary internal combustion engine comprising at least one engine module which further comprises:

a housing;

a shaft journaled in the housing such that one of the shaft and the housing is free to rotate with respect to the other;

a pair of carrying walls mounted on the shaft within the housing, the carrying walls being positioned with respect to the housing and the shaft so as to define a toroidal operating chamber between them;

a pair of pistons carried by each carrying wall and disposed opposite one another, so that the pistons are interdigitated and the operating chamber is divided into discrete work chambers by the interdigitated pistons;

outer one way clutch means having their outer members immovably connected to the housing and their inner members each immovably connected to a respective carrying wall, the outer one way clutch means being oriented so as to permit both of the carrying walls to rotate only in one given direction with respect to the housing;

inner one way clutch means having their inner members immovably connected to the shaft and their outer members each immovably connected to a respective carrying wall, the inner one way clutch means being oriented so as to permit the shaft to rotate in the same given direction with respect to the carrying walls;

intake means for providing fuel and air to each of the work chambers;

means for igniting the fuel in each of the work chambers;

exhaust means for venting the combustion products from each of the work chambers; and timing means for controlling the intake means, means for igniting the fuel, and the exhaust means solely as a function of the relative position of the carrying walls to each other.

5. A rotary internal combustion engine as claimed in claim 4 and further comprising:

a pair of piston pins affixed to each carrying wall parallel to the shaft, the pistons being rotatably mounted on the piston pins so as to be able to seal against the operating chamber.

6. A rotary internal combustion engine as claimed in claim 5 wherein the operating chamber has a generally rectangular cross section and each piston has a generally rectangular cross section.

7. A rotary internal combustion engine as claimed in claim 6 wherein each of the pistons has at least one groove around its circumference substantially perpendicular to the direction of the piston's motion, and further comprising:

two pairs of right angle semirings having tapered ends, the semirings of each pair being oriented facing one another with their tapered ends overlapping and the two pairs of right angle semirings being disposed in each groove such that the jointed corners of one pair of semirings are protected by the unjointed corners of the second pair of semirings; and spring means disposed in the grooves under the semirings, so as to urge the semirings into sealing engagement against the walls of the operating chamber.

8. A rotary internal combustion engine as claimed in claim 4, wherein the housing is fixed, and the power of the engine is drawn off of the shaft.

9. A rotary internal combustion engine as claimed in claim 4, wherein the shaft is fixed, and the power of the engine is drawn off of the housing.

10. A rotary internal combustion engine as claimed in claim 4, wherein the intake means and exhaust means comprise an endplate having annular channels therein, which channels communicate with the work chambers via ports in the carrying walls.

11. A rotary internal combustion engine as claimed in claim 10, wherein the means for igniting the fuel comprises spark means disposed within the carrying wall, which spark means maintains electrical contact with the timing means by way of an annular commutator strip disposed on the inner face of the endplate.

12. A compound rotary internal combustion engine comprising at least two engine modules as claimed in claim 4, wherein the engine modules are coaxially disposed and share a common shaft.

13. A compound rotary internal combustion engine comprising two engine modules as claimed in claim 4, wherein the modules are operatively connected in series, with the shaft of the first module fixed to the housing of the second module.

14. A compound rotary internal combustion engine comprising two engine modules as claimed in claim 4, wherein the modules are connected concentrically with the first module being of smaller diameter than the second module so that the housing of the first module can serve as the shaft of the second module, thereby combining the outputs of the modules additively.

15. A rotary internal combustion engine comprising at least one engine module which further comprises:

a housing;

a fixed annular endplate;

a movable annular endplate;

a shaft journaled in the housing, with the housing, fixed annular endplate, movable annular endplate, and shaft being positioned with respect to one another so as to define a toroidal operating chamber between them;

four pistons, two of which are attached to the shaft disposed opposite one another, and two of which are attached to the inside of the housing diametrically opposite one another, the pistons being of appropriate dimensions to divide the operating chamber into four discrete work chambers;

first and second outer one way clutch means through which the fixed annular endplate and movable annular endplate are mounted to the inside of the housing, respectively, the first and second outer one way clutch means being oriented in opposite directions;

first and second inner one way clutch means through which the fixed annular endplate and the movable annular endplate, respectively, are mounted to the shaft, the first inner one way clutch means being oriented in the direction opposite to the direction of orientation of both the first outer one way clutch means and the second inner one way clutch means;

intake means for providing fuel and air to each of the work chambers;

means for igniting the fuel in each of the work chambers;

exhaust means for venting the combustion products from each of the chambers; and timing means for controlling the intake means, means for igniting the fuel, and exhaust means solely as a function of the relative position of the shaft and the housing to each other.

16. A compound rotary internal combustion engine comprising two engine modules as recited in claim 15 wherein the modules are connected linearly in series, with the movable annular endplate of the first module attached to the fixed endplate of the second module.

17. A rotary internal combustion engine comprising at least one engine module which further comprises:

a housing;

a fixed annular endplate;

a movable annular endplate;

a shaft journaled in the housing, with the housing, fixed annular endplate, movable annular endplate, and shaft being positioned with respect to one another so as to define a toroidal operating chamber between them;

four pistons, two of which are attached to the shaft disposed opposite one another, and two of which are attached to the inside of the housing diametrically opposite one another, the pistons being of appropriate dimensions to divide the operating chamber into four discrete work chambers;

first and second outer one way clutch means having their outer members immovably connected to the housing and with the inner member of the first outer one way clutch means immovably connected to the movable annular endplate and with the inner member of the second outer one way clutch means immovably connected to the fixed annular endplate, the first and second outer one way clutch means being oriented in opposite directions;

first and second inner one way clutch means having their inner members immovably connected to the shaft and with the outer member of the first inner one way clutch means immovably connected to the movable annular endplate and with the outer member of the second inner one way clutch means immovably connected to the fixed annular endplate, the first inner one way clutch means being oriented in the direction opposite to the direction of orientation of both the first outer one way clutch means and the second inner one way clutch means;

intake means for providing fuel and air to each of the work chambers;

means for igniting the fuel in each of the work chambers;

exhaust means for venting the combustion products from each of the chambers; and timing means for controlling the intake means, means for igniting the fuel, and exhaust means solely as a function of the relative position of the shaft and the housing to each other.

18. A compound rotary internal combustion engine comprising two engine modules as recited in claim 17 wherein the modules are connected linearly in series, with the movable annular endplate of the first module attached to the fixed endplate of the second module.

* * * * *

UNITED STATES PATENT AND TRADEMARK OFFICE
CERTIFICATE OF CORRECTION

PATENT NO. : 4,319,551

DATED : March 16, 1982

INVENTOR(S) : Bernard Rubinshtein

It is certified that error appears in the above—identified patent and that said Letters Patent is hereby corrected as shown below:

On the title page

[76] Inventor: Bernard Rubinshtein, 215 Blueberry La., Apt. C, Thousand Oaks, Calif. 91360 should read -- Bernard Rubinshtein, 5324 N. Cedarhaven Drive, Agoura, Calif. 91301 --. Column 8, Line 54, "FIG. 18" should read -- FIG. 17 --. Column 11, Line 19, "Y1" should read -- $Y_1$ --; Line 52, "$A_q$" should read -- $A_9$ --. Column 12, Line 14, "All" should read -- $A_{11}$ --.

Signed and Sealed this

Twelfth Day of October 1982

[SEAL]

Attest:

Attesting Officer

GERALD J. MOSSINGHOFF

Commissioner of Patents and Trademarks